(12) United States Patent
Menon et al.

(10) Patent No.: US 9,133,864 B2
(45) Date of Patent: Sep. 15, 2015

(54) FLUIDIC ACTUATOR AND METHOD OF MANUFACTURE

(75) Inventors: Carlo Menon, Burnaby (CA); John Berring, Coquitlam (CA)

(73) Assignee: SIMON FRASER UNIVERSITY, Burnaby (CA)

( * ) Notice: Subject to any disclaimer, the term of this patent is extended or adjusted under 35 U.S.C. 154(b) by 631 days.

(21) Appl. No.: 13/500,444

(22) PCT Filed: Oct. 7, 2010

(86) PCT No.: PCT/CA2010/001619
§ 371 (c)(1),
(2), (4) Date: Apr. 5, 2012

(87) PCT Pub. No.: WO2011/041909
PCT Pub. Date: Apr. 14, 2011

(65) Prior Publication Data
US 2012/0216672 A1    Aug. 30, 2012

Related U.S. Application Data

(60) Provisional application No. 61/249,574, filed on Oct. 7, 2009.

(51) Int. Cl.
*F15B 15/10* (2006.01)
*B25J 9/14* (2006.01)

(52) U.S. Cl.
CPC ............... *F15B 15/10* (2013.01); *B25J 9/142* (2013.01); *Y10T 29/494* (2015.01)

(58) Field of Classification Search
CPC ......... F15B 15/10; Y10T 29/494; B25J 9/142

USPC ...................... 92/89, 92; 29/890.09
See application file for complete search history.

(56) References Cited

U.S. PATENT DOCUMENTS

| 4,733,603 A | 3/1988 | Kukolj |
| 4,976,191 A | 12/1990 | Suzumori et al. |
| 5,156,081 A | 10/1992 | Suzumori |

(Continued)

FOREIGN PATENT DOCUMENTS

| WO | WO 01/17731 A1 | 3/2001 |
| WO | WO 02/099172 A1 | 12/2002 |

(Continued)

OTHER PUBLICATIONS

K. Suzumori, Elastic Materials Producing Compliant Robots, Robotics and Autonomous Systems, 1996, pp. 135-140, vol. 18, Elsevier, Kawasaki, Japan.

(Continued)

*Primary Examiner* — Thoams E Lazo
(74) *Attorney, Agent, or Firm* — Palmer IP

(57) ABSTRACT

A small, flexible fluidic actuator is presented which may be of millimeter scale in size and made of suitable flexible materials such as silicone. A manufacturing method and two analytical models for the device along with experimental test results are also disclosed. The flexible fluidic actuator devices disclosed include multidirectional fluidic actuator joints providing independently controllable multi-directional actuation movement. The dynamic behavior of the joints for various pressure loads was also characterized and described herein.

15 Claims, 14 Drawing Sheets

2401

2401

Semi-Cylindrical actuator centered around an inextensible backbone

(56) References Cited

U.S. PATENT DOCUMENTS

| | | | |
|---|---|---|---|
| 5,218,280 | A | 6/1993 | Edwards |
| 5,385,080 | A | 1/1995 | Suzumori |
| 5,791,231 | A | 8/1998 | Cohn et al. |
| 8,201,473 | B2 * | 6/2012 | Knoll .................. 74/490.05 |
| 2005/0085693 | A1 | 4/2005 | Belson et al. |
| 2007/0060997 | A1 | 3/2007 | de Boer |
| 2010/0132797 | A1 * | 6/2010 | Prins et al. ................. 137/1 |

FOREIGN PATENT DOCUMENTS

| | | | |
|---|---|---|---|
| WO | WO 2008046566 | A1 * | 4/2008 |
| WO | WO 2008114199 | A2 * | 9/2008 |

OTHER PUBLICATIONS

M. Lazeroms, A. La Haye, W. Sjoerdsma, W. Schreurs, W. Jongkind, G. Honderd, and C. Grimbergen, A Hydraulic Forceps With Force-Feedback for Use in Minimally Invasive Surgery, Mechatronics, 1996, pp. 437-446, vol. 6 No. 4, Pergamon, Great Britain.

A. De Greef, P. Lambert, and A. Delchambre, Towards Flexible Medical Instruments: Review of Flexible Fluidic Actuators, Precision Engineering, Nov. 5, 2008, pp. 311-321, vol. 33, Elsevier Inc., Bruxelles, Belgium.

K. Suzumori, S. Iikura, H. Tanaka, Flexible Microactuator for Miniature Robots, MEMS 1991 Proceedings, CH2957-9/9110000-0204, 1991, IEEE, Yokohama, Japan.

K. Suzumori, S. Iikura, H. Tanaka, Applying a Flexible Microactuator to Robotic Mechanisms, Control Systems, p. 12-27, vol. 12, Iss 1, 0272-1708/92, Feb. 1992, IEEE, USA.

K. Suzumori, S. Iikura, H. Tanaka, Development of Flexible Microactuator and its Applications to Robotic Mechanisms, IEEE International Conference on Robotics and Automation Proceedings, Apr. 1991, IEEE, Sacramento, California.

K. Suzumori, A. Koga, R. Haneda, Microfabrication of Integrated FMAs Using Stereo Lithography, Micro Electro Mechanical Systems MEMS 1994 Proceedings, 1994, 0/7803-1833-1/94, IEEE, Kawasaki, Japan.

K. Suzumori, T. Maeda, H. Watanabe, T. Hisada, Fiberless Flexible Microactuator Designed by Finite-Element Method, IEEE/ASME Transactions on Mechatronics, Dec. 1997, p. 281-286, vol. 2, No. 4, IEEE.

O. C. Jeong, S. Kusuda, S. Konishi, All PDMS Pneumatic Balloon Actuators for Bidirectional Motion of Micro Finger, Micro Electro Mechanical Systems MEMS 2005 Proceedings, 2005, 0/7803-8732-5/05, IEEE, Kyoto, Japan.

B. Chang, A. Chew, and C. Menon, A novel microchannel fluidic joint for bio-mechatronic applications, 2010, IEEE/RA/EMB/IFMBE Int. Conf. Applied Bionics Biomechnics 2010, IEEE, Venice, Italy.

Chang, B., Chew, A., & Menon, C., A Novel Spatial Microchannel Fluidic Joint, Biodevices, 2011, pp. 238-243, IEEE, USA.

* cited by examiner

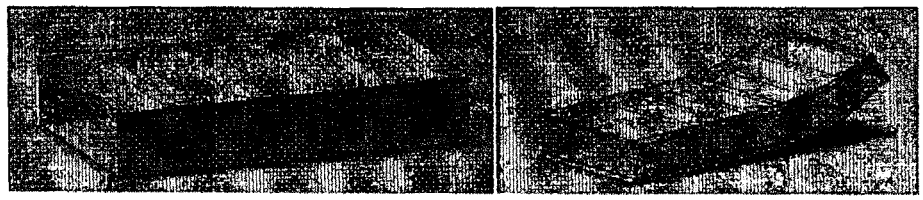
Figure 1A. Illustation of an actuator embodiment. Left: actuator in relaxed state Right: deflected actuator due to positive pressure in embedded fluidic channels.
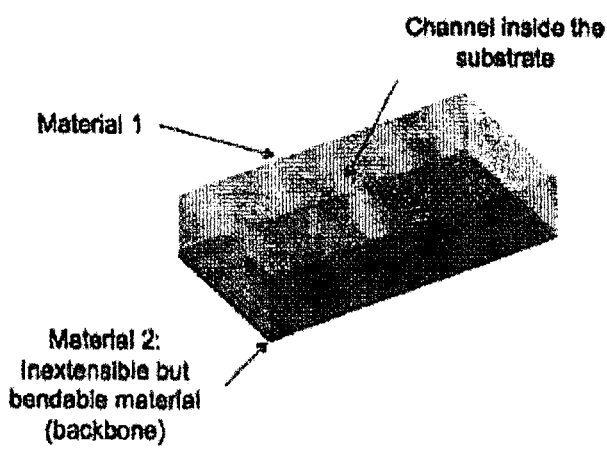
Figure 1B. Design of a fluidic actuator embodiment.

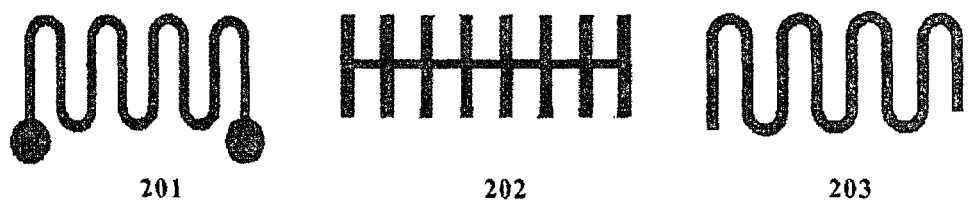
Figure 2: Three exemplary channel designs tested
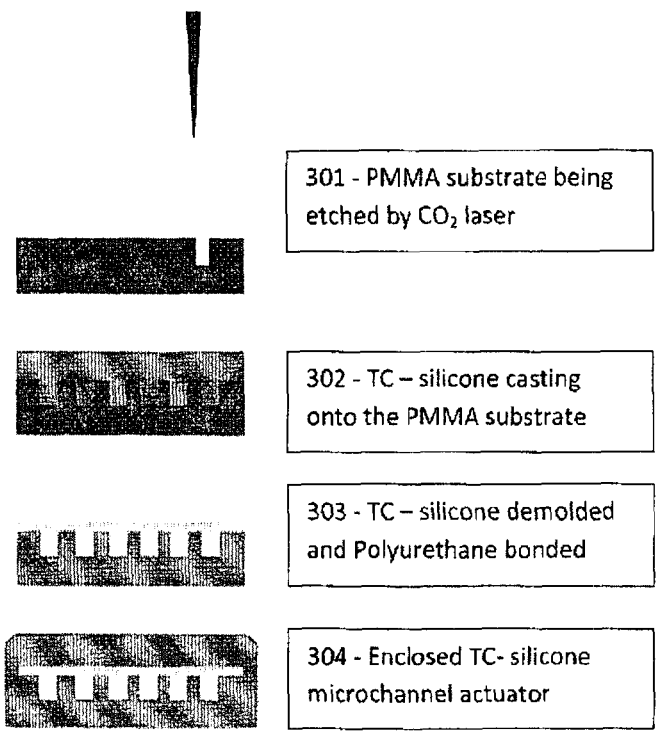
Figure 3: Manufacturing Process Embodiment

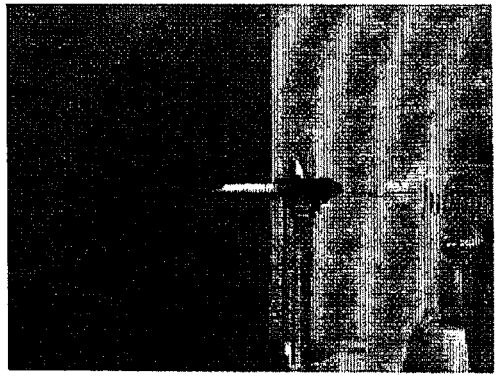
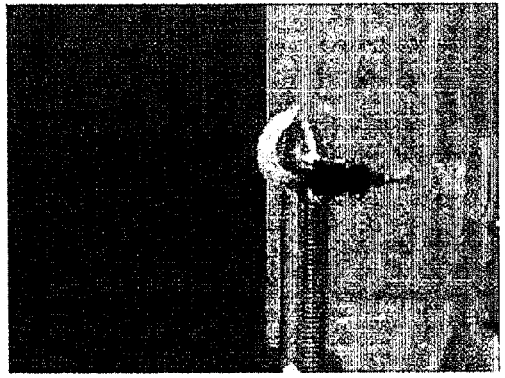
Figure 4. Deflection of the actuator at 20kPa and 70 kPa for a force of 0N
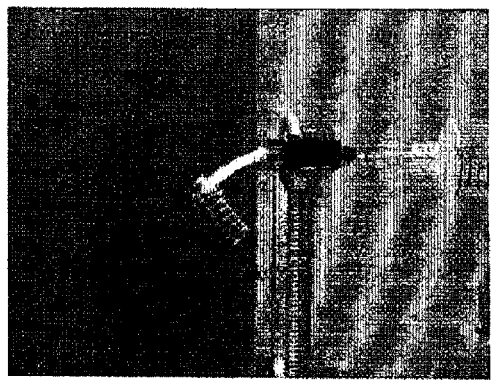
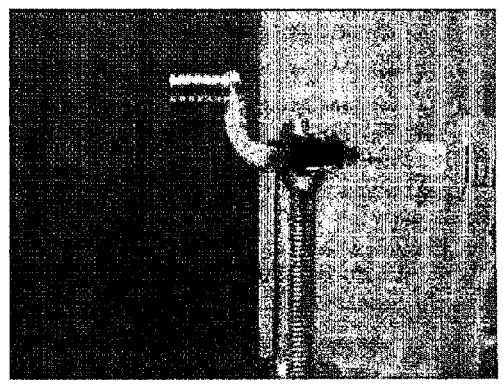
Figure 5. Deflection of the actuator at 20kPa and 70kPa for a force of 0.103N

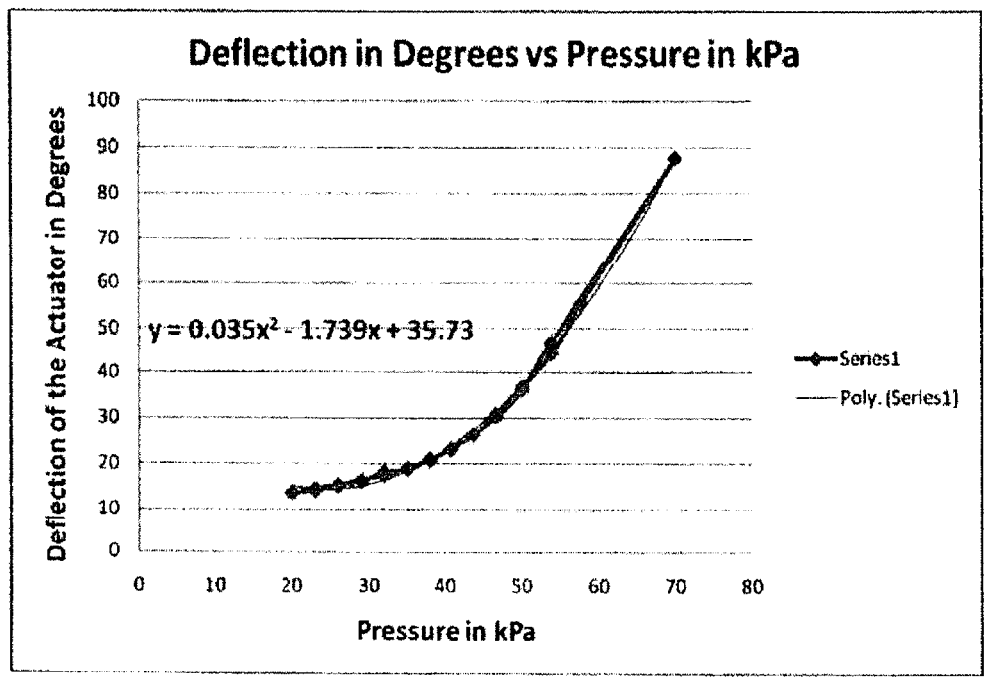
Figure 6. Plot of the Deflection of an actuator vs. the Pressure for a force of 0 N
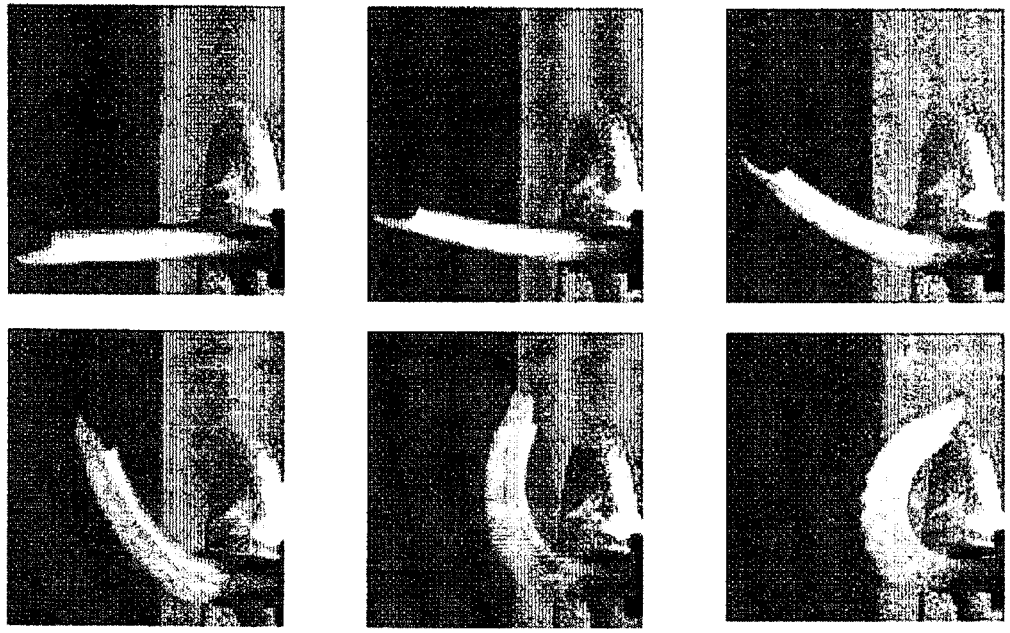
Figure 7: An exemplary TC 5005 AB fluidic actuator bending due to applied pressure

Figure 8: Screenshot of a single image analysis frame.
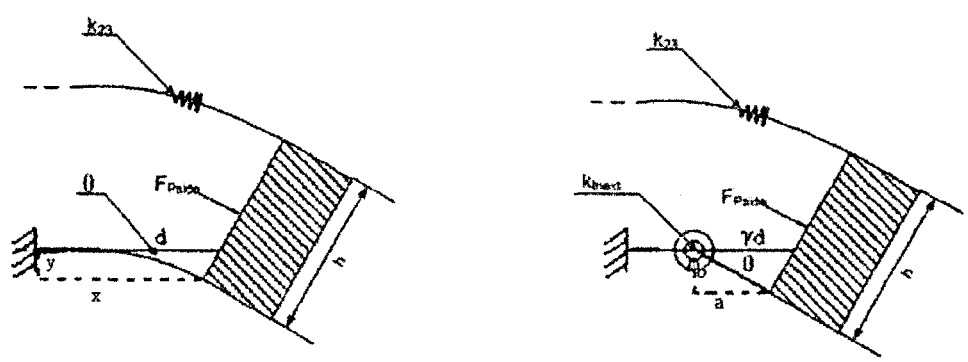
Figure 9: Half channel model diagram. Left: Elastic Beam & Linear Spring Model
Right: Psuedo Rigid Body Beam & Linear Spring Model

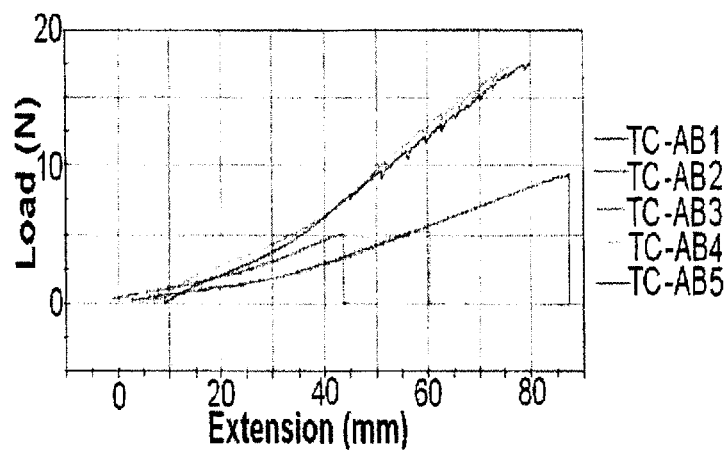
Figure 10: Stress-Strain plot of 5 TC5005-AB samples.
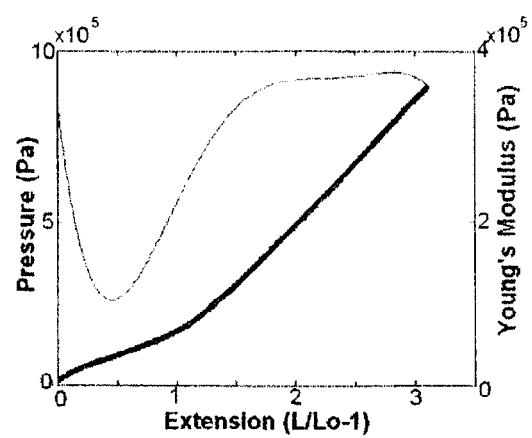
Figure 11: Stress as a function of extension (Red: Data, Blue: Fit Function) and Young's Modulus as a function of extension (Green: Fit Function).

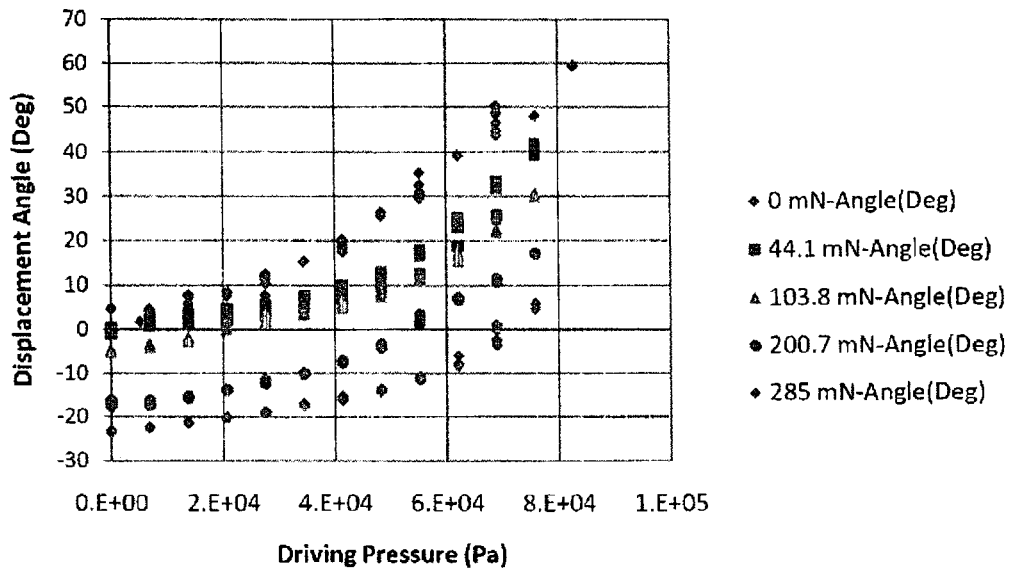
Figure 12: TC5005 AB Actuator rotation V. Pressure with varying maximum torques.
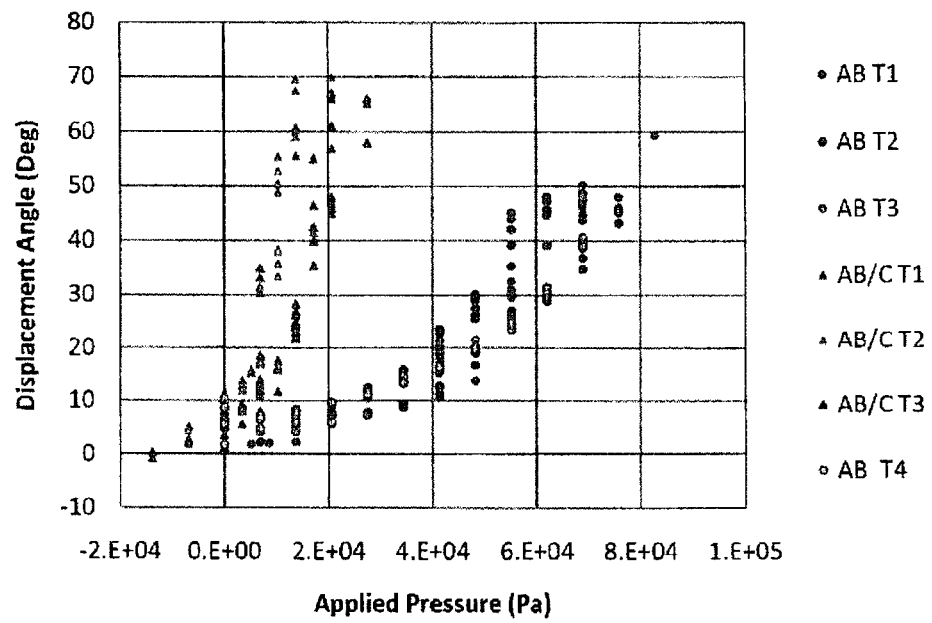
Figure 13: TC 5005 AB (Circles) and TC 5005 AB+C (Triangles) comparative paths of motion. T1-T4 refer to the actuator trial number.

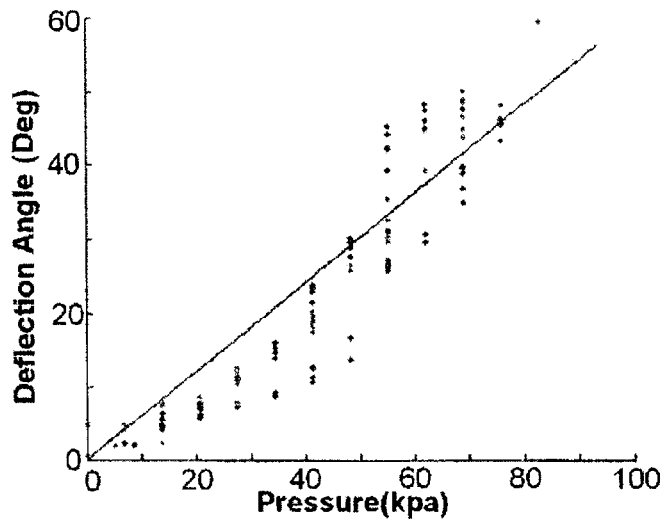
Figure 14: TC 5005 AB angular displacement with pressure, no load, overlaid by the constant Young's Modulus fitting function.
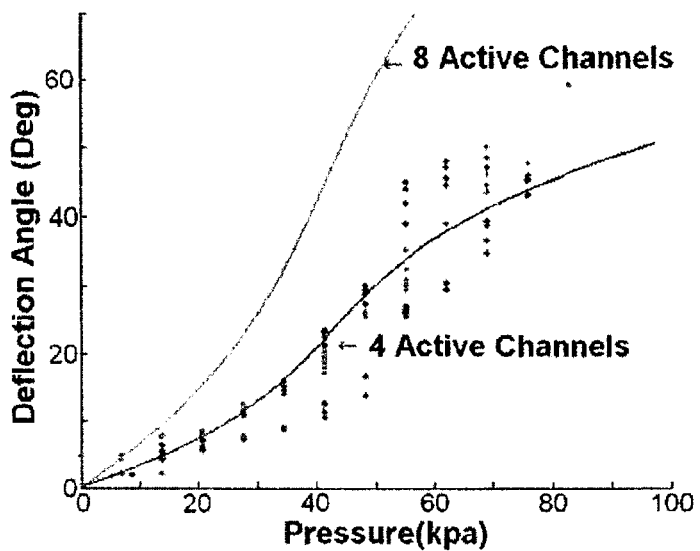
Figure 15: TC 5005 AB angular displacement with pressure, no load, overlaid by two varying Young's Modulus fitting functions.

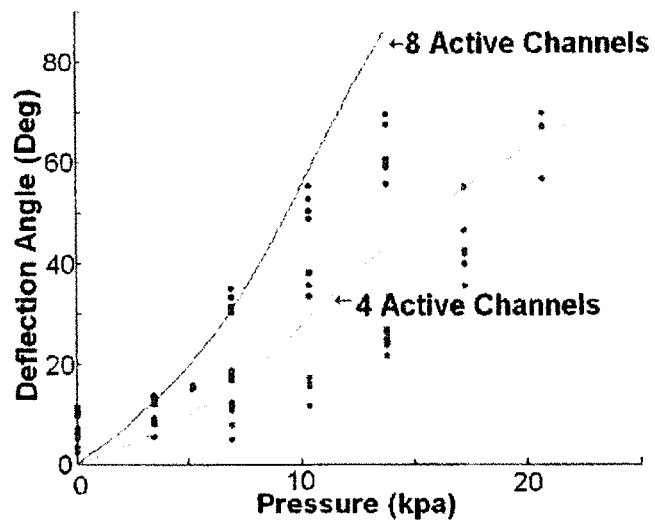
Figure 16: TC 5005 AB/C angular displacement with pressure, no load, overlaid by two varying Young's Modulus fitting functions.
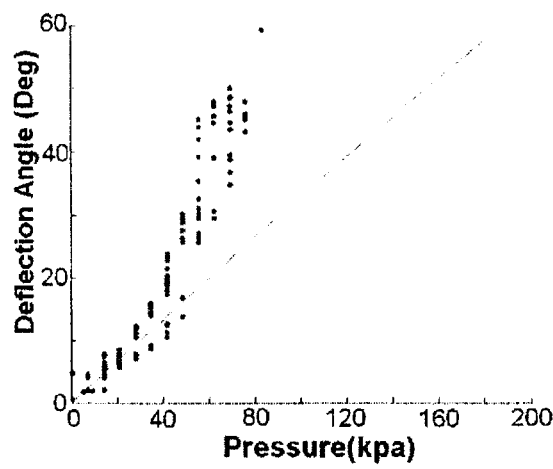
Figure 17: TC 5005 AB angular displacement with pressure, no load, overlaid by the work-energy fitting function.

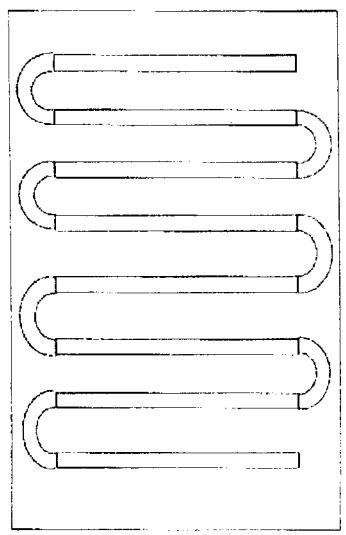 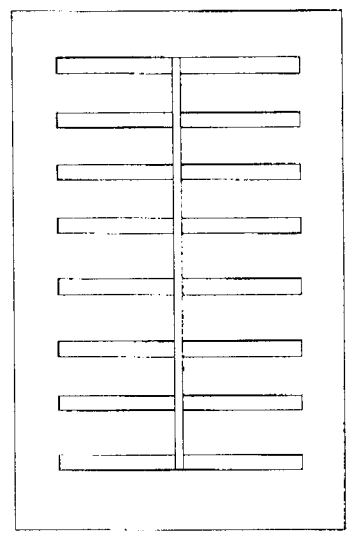
1801      1802
Figure 18
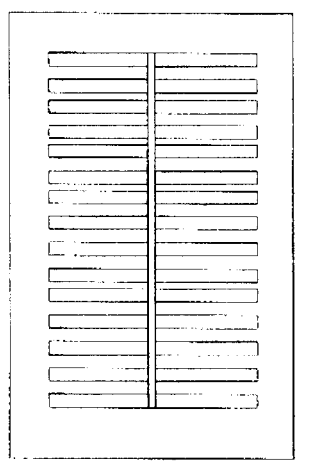 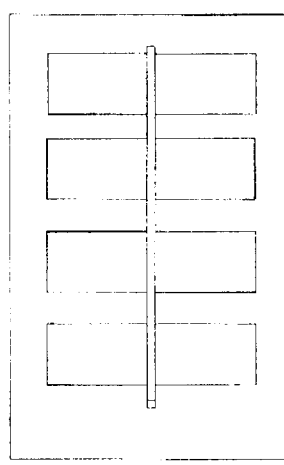 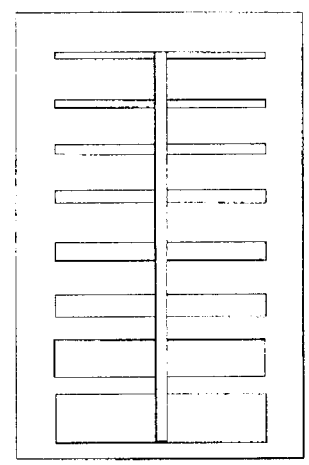
1901      1902      1903
Figure 19

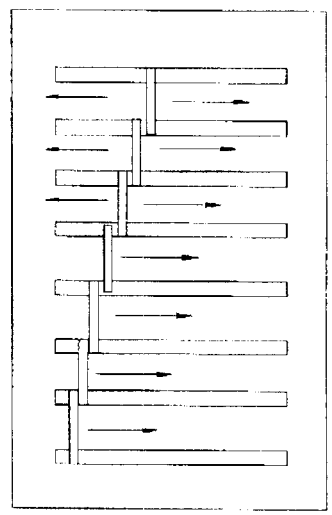
2001
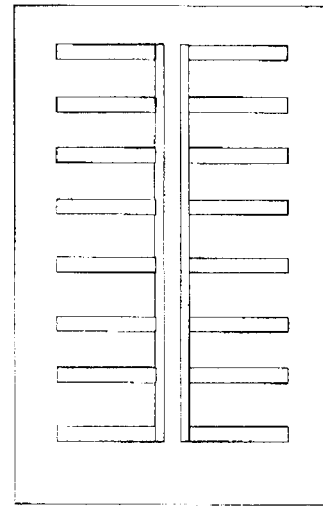
2002
Figure 20
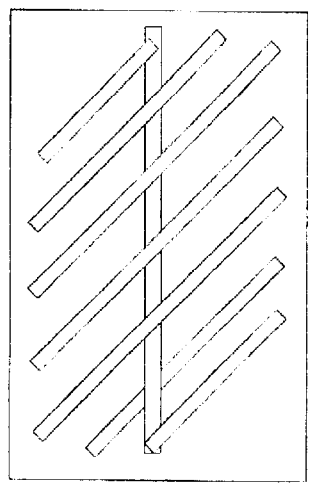
2101
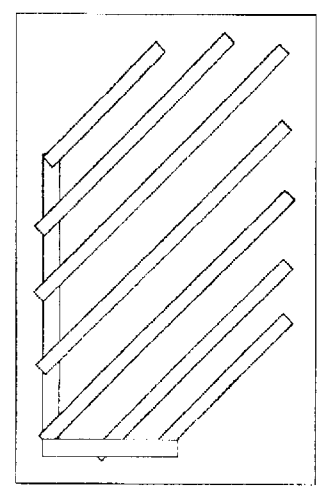
2102
Figure 21

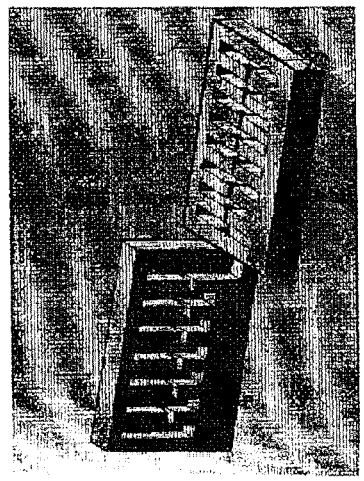
2201
Figure 22 : Exemplary 2-DOF multi-planar fluidic actuator
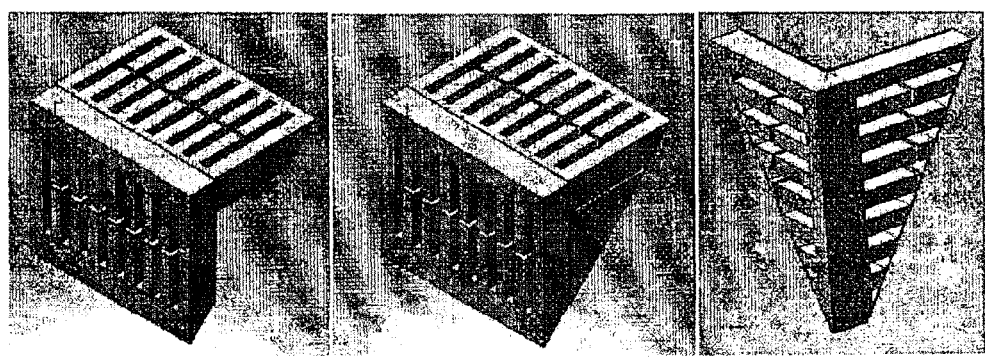
2301　　　　　　　　2302　　　　　　　　2303
Figure 23: Exemplary 2-DOF multi-planar actuators

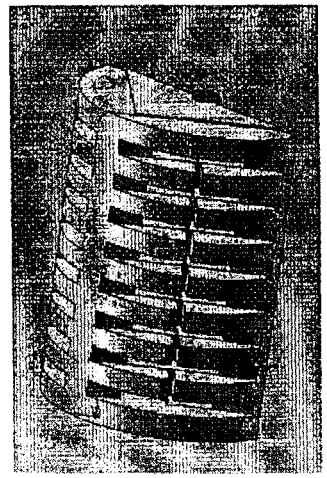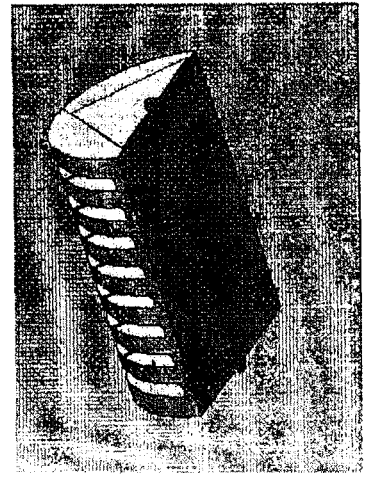
2401　　　　　　　　　　2401
Figure 24: Semi-Cylindrical actuator centered around an inextensible backbone
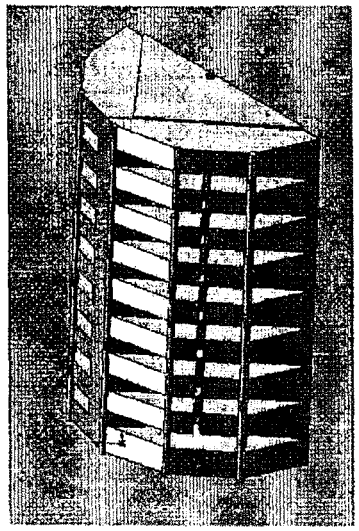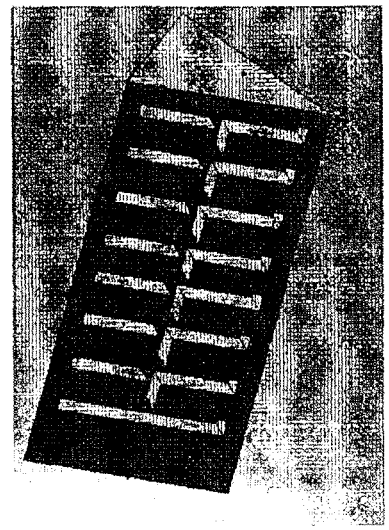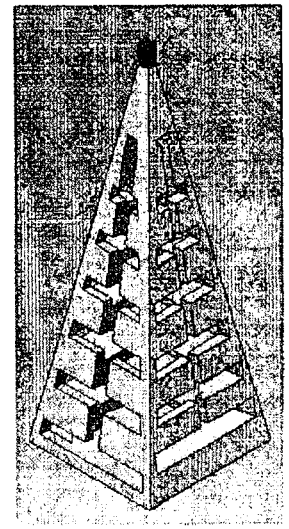
2501　　　　　　　　2502　　　　　　　　2503
Figure 25: Three 2-DOF designs with independent actuator channel arrays

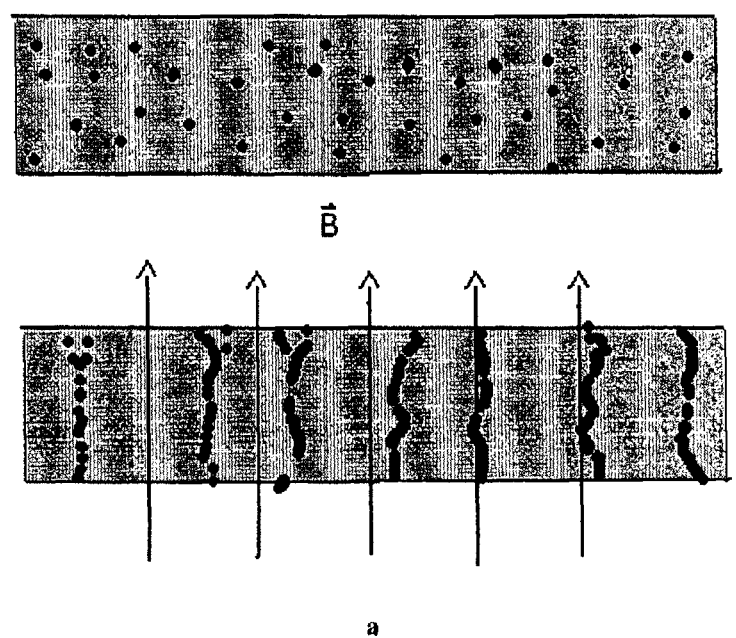
Figure 26: A Magnetorheological Fluid with no applied magnetic field (top) and with a uniform magnetic field (bottom).

FLUIDIC ACTUATOR AND METHOD OF MANUFACTURE

1. FIELD OF THE INVENTION

The present invention relates generally to actuators. More particularly, the present invention relates to fluidic actuators and methods of manufacturing the same.

2. BACKGROUND OF THE INVENTION

With the advent of bio-compatible materials and integrated electronics, many surgical procedures have migrated toward the use of minimally invasive tools. These tools allow surgical procedures to be carried out by robotic appendages operated through small incisions. As devices reduce in size however, new classes of mechanical actuators and joints must be considered in order to allow controlled motion in extremely confined spaces. In addition, these tools must function using ultra low electrical power or preferably without using any electrical power source. Further, the material used for these instruments should be non-toxic and compliant enough to prevent tissue damage during manipulation of the instrument during the surgical process.

Fluidic actuators are relatively simple systems that can be beneficially applied to provide actuation movement capabilities to a diverse range of devices. Whereas many other types of actuators require an electrical voltage or current, a magnetic field or temperature changes to provide actuation operation, fluidic actuators require only a hydraulic or pneumatic pressure to provide actuation motion. Therefore, fluidic actuators may be use suitable for operation in a variety of environments, such as the human body, for which other types of actuators may be unsuitable or undesirable.

3. SUMMARY OF THE INVENTION

Flexible fluidic actuators are disclosed according to multiple embodiments of the present invention, for application in a variety of fields including medical/surgical instruments, such as laparoscopes, catheters, and/or other medical tools or probes, as well as in other areas of miniaturized robotics. These actuators may include small polymer based joints, which can twist or bend with an increase in internal pressure. They may implement sealed bladders, encased in a flexible material to create a torque or linear force upon actuation. With a single moving body, the flexible fluidic actuators according to certain embodiments of the invention may desirably require no lubrication and may be less susceptible to wear than similarly sized metal actuators, for example. Certain such flexible actuators according to an embodiment of the invention do not require an electrical power supply to the actuator tip and may also be compliant in multiple directions. In one such embodiment, a flexible actuator joint may comprise multiple individual actuator members configured in different orientations to provide individually controllable actuation in multiple directions, or individually controllable actuation through multiple degrees of freedom, for example.

A novel silicone-based flexible fluidic actuator is disclosed according to an embodiment of the invention incorporating a suitable flexible silicone material such as silicone material commercially available as TC-5005 such as from BJB Enterprises, Inc., for example. The actuator may be implemented in possible applications such as a miniaturized planar robotic manipulator or active catheter joint. In one such embodiment, such a joint or manipulator may comprise multiple individual actuator members configured in different orientations to provide individually controllable actuation in multiple directions, or individually controllable actuation through multiple degrees of freedom.

A flexible fluidic actuator according to an embodiment of the invention may be fabricated through a method implementing soft lithogaphy, such as by using a laser ablated Polymethyl methacrylate (PMMA) optix substrate as a mold and may be hermetically sealed using a flow-over sealing technique. In one embodiment, working pressure of the actuator may be in the range of about 0 to 80 kPa, for example. In analysis of one experimental example of such an embodiment, deflection measurements were analyzed in relation to a force range of about 0-285 mN. Repeated angular displacement measurements on multiple models according to embodiments of the invention were also carried out in order to characterize the consistency of "identical" prototypes. In the method of manufacturing of fluid actuators according to an embodiment of the invention, the TC-silicone (such as TC-5005 silicone) mixing ratio may be adjusted to produce joint materials of varying Young's Modulus as may be suitable or desired for particular applications.

Other potential applications of fluidic actuators according to embodiments of the present invention may include multiple applications to replace actuated joints. The simplicity of the fluidic actuator design according to an embodiment of the invention could allow potential implementations in either macro-/micro-/nano-scale. An exemplary micro-/nano-scale application may include embedded use, for instance, on medical tools and probes (e.g. laparoscopic devices, catheters, etc.). An embodiment of the fluidic actuator according to the invention may also desirably allow individual control and actuation of active bending in different orientations, or in multiple dimensions and/or directions or degrees of freedom, for example. The use of smart materials in a further embodiment may provide for the ability to change the stiffness of the joint and therefore increase its resistance to bending when external loads are applied. A further embodiment may be applied in macro-scale including integration of the fluidic actuator on robotic arms, prostheses and/or orthoses, for example.

4. BRIEF DESCRIPTION OF THE DRAWINGS

FIG. 1 illustrates perspective views of a fluidic actuator according to an embodiment of the present invention.

FIG. 2 illustrates schematic views of fluid channel designs according to an embodiment of the present invention.

FIG. 3 illustrates steps for a method of manufacturing a fluidic actuator according to an embodiment of the invention.

FIG. 4 illustrates resting and actuated positions of a fluidic actuator according to the present invention corresponding to an applied force of 0N.

FIG. 5 illustrates resting and actuated positions of a fluidic actuator according to the present invention corresponding to an applied force of 0.103N.

FIG. 6 illustrates a plot of deflection vs. pressure for a fluidic actuator according to an embodiment of the invention.

FIG. 7 illustrates several views of progressive actuation of a fluidic actuator according to an embodiment of the invention.

FIG. 8 illustrates a schematic view of an image analysis frame of a fluidic actuator according to an embodiment of the present invention.

FIG. 9 illustrates schematic views of a modeled representation of a fluidic actuator according to an embodiment of the invention.

FIG. 10 illustrates a plot of stress vs. strain for a fluidic actuator according to an embodiment of the invention.

FIG. 11 illustrates a plot of stress vs. extension for a fluidic actuator according to an embodiment of the invention.

FIG. 12 illustrates a plot of rotation vs. pressure for a fluidic actuator according to an embodiment of the invention.

FIG. 13 illustrates a plot of displacement angle vs. pressure for a fluidic actuator according to an embodiment of the invention.

FIG. 14 illustrates a plot of deflection vs. pressure under no load for a fluidic actuator according to an embodiment of the invention.

FIG. 15 illustrates a plot of deflection vs. pressure with Young's modulus fitting functions for a fluidic actuator according to an embodiment of the invention.

FIG. 16 illustrates a plot of deflection vs. pressure for a fluidic actuator according to another embodiment of the invention.

FIG. 17 illustrates a plot of deflection vs. pressure with a work-energy fitting function for a fluidic actuator according to an embodiment of the invention.

FIG. 18 illustrates plan views of fluidic actuator designs according to an embodiment of the present invention.

FIG. 19 illustrates plan views of further fluidic actuator designs according to embodiments of the present invention.

FIG. 20 illustrates plan views of yet further fluidic actuator designs according to embodiments of the present invention.

FIG. 21 illustrates plan views of asymmetric fluidic actuator designs according to embodiments of the present invention.

FIG. 22 illustrates a perspective view of a multidirectional fluidic actuator according to an embodiment of the invention.

FIG. 23 illustrates perspective views of further multi-directional fluidic actuators according to embodiments of the invention.

FIG. 24 illustrates perspective views of a semi-cylindrical multi-directional fluidic actuator according to an embodiment of the invention.

FIG. 25 illustrates perspective views of two degree-of-freedom fluidic actuator arrays with independent actuator channels having substantially semi-dodecahedral prismatic, triangular prismatic and substantially tetrahedral orientations, according to embodiments of the invention FIG. 26 illustrates schematic views of a Magnetorheological Fluid with no magnetic field applied (top view) and under application of a uniform magnetic field (bottom view), according to the prior art.

5. DETAILED DESCRIPTION OF SEVERAL EMBODIMENTS

Design and Manufacture of Flexible Fluidic Actuators According to Several Embodiments:

Fundamental Operation

The actuation mechanism of the flexible fluidic actuators according to one embodiment of the present invention is based on differences in the Young's Modulus of two materials. A relatively softer, deformable si-rubber (silicone-rubber) may be embedded with millimeter scale fluidic channels and attached to a comparatively thin sheet or member of a flexible, but substantially inextensible plastic, polymer, or other suitable material to form a structural or backbone member of the actuator. Increasing the pressure inside the fluidic channels of the actuator may then apply expansive stress to 4 interior walls of each divot or section of the fluidic channel in the actuator, as illustrated in FIG. 1A. As a result, the relatively softer material may preferably expand about each fluidic channel while the relatively inextensible backbone at the base and/or along one side of the actuator may preferably show relatively low strain. By anchoring one side of the fluidic actuator, a single degree of freedom joint may be created according to an embodiment. In one such embodiment, the range of motion of such a joint, may extend up to about +90 degrees and down to about −30 degrees depending on the attached load and the effect of applying negative pressure to the fluidic channels' interiors, such as by variation of pressure in a hydraulic and/or pneumatic fluid within the fluidic channels, for example.

In one test of actuators made according to an embodiment of the invention, the exemplary actuators, as shown in FIG. 1A, had lengths of about 15.0-19.0 mm, widths of about 9.0-12.0 mm and thicknesses of about 2.9-3.0 mm. The perpendicular channels had dimensions of about 0.7×2.0×9.0 mm. The mass of the average, empty, unconnected actuator was about 0.7 grains. It is to be understood that while these dimensions represent a one exemplary actuator embodiment according to the invention, other embodiments may be constructed having differing dimensions and specifications, such as for use in applications requiring different sizes and/or properties of actuators, for example.

According to another embodiment of the invention, a flexible fluidic actuator may comprise a substrate material such as an exemplary silicone-rubber, such as is illustrated and identified as Material 1 in FIG. 1B, which has embedded and fluidly connected fluidic channels. Pressurization of these fluidic channels may desirably yield an elongation of the substrate material. A different material, which is substantially inextensible but bendable and/or flexible (identified as Material 2 or backbone in FIG. 1B), is attached on one side of the structure to provide a backbone member. The backbone member may desirably substantially prevent elongation of the actuator structure, but may preferably allow bending of the structure. In this way a biomorphic actuator may be obtained according to one embodiment of the invention.

Mold Design

The first step in a method of manufacturing fluidic actuator elements according to an embodiment of the invention, is making a mold. The negative-shape of the fluidic actuator structure may be created by etching a design/shape of one or more fluidic channels in a mold component, such as by using a laser beam, such as a Versa CO2 laser for example, or alternatively, any suitable etching and/or engraving instrument. In one embodiment, the substrate used for the mold may be a single block of PMMA (poly methyl methacrylate, also known as Plexiglas) of suitable size relative to the desired actuator, such as an exemplary 3 inch by 3 inch PMMA block for example. PMMA and/or suitable similar mold materials may be chosen for use in the mold substrate due to their low glass transition temperature properties, which may desirably allow potential warping of the substrate to be controlled. Three exemplary different channel designs which were tested by the applicant are illustrated as fluidic channels 201, 202 and 203 in FIG. 2.

In one embodiment of the invention, the designs for the microfluidic channels in the fluidic actuator may be created using any suitable computer drafting system, such as Corel Draw™ version X4, for example. In such an embodiment, the computer drafting software may desirably be coupled to a control system for controlling a suitable engraving/etching device, such as the UCP (Universal Control Panel) software which controls a laser etching or cutting device, such as a Versa CO2 laser for example. The first fluidic channel design 201 illustrated in FIG. 2 comprises a serpentine fluidic channel with two ports. The next two fluidic channel designs 202 and 203 in FIG. 2 show exemplary modifications of the first design with changes in the number of ports. An array of different sized fluid actuator structures may desirably be designed to fit in the mold substrate component, such as the exemplary 3"×3" PMMA mold substrate block.

The smallest fluidic channel structure experimentally implemented using the designs 201, 202 and 203 illustrated in FIG. 2 had a feature size of about 500 μm for fluidic channel width with 5 turns and port sizes of about 1 mm for example. The depth of the exemplary etched channels illustrated in designs 201, 202 and 203 of FIG. 2 as implemented in experimental embodiments were measured to be about 2 mm. A 3"×3" frame with a rim of about 5 mm may also be etched out of the mold to aid in the use of the exemplary mold in a casting process. As noted throughout this disclosure, in other embodiments of the invention, molds, and corresponding actuators may be constructed of different sizes and dimensions than those of the exemplary embodiment recited immediately above.

Setting the Mold

The next steps in a manufacturing method according to an embodiment of the invention include the preparation, casting and demolding of a suitable polymer material. An exemplary structural material used for the extensible actuator base component including the fluidic channels may include TC-5005 silicone, for example. In one embodiment, a TC-5005 silicone material may be prepared by combining a three part fluid mix: 1 part silicone base (A), 1 part curing agent (B) and 1 part softener (C). In one embodiment, the exemplary TC-5005 silicone may be chosen over other potentially useful polymers, such as Polydimethylsiloxane (PDMS), due to its desirable physical properties, including high tear resistance, high elongation and high tensile strength, however other suitable extensible and moldable polymer materials, such as PDMS and other silicones for example, may also be used.

For manufacturing one exemplary set of fluidic actuators according to an embodiment of the invention, a ratio of TC-5005 silicone with 10 parts by weight of Part A to 1 part by weight of Part B was used. Part A and Part B were mixed together using a glass rod for 5 minutes. This mixing process may result in formation of many air bubbles in the mixture, which may be desirably removed before curing. As the working life of the exemplary TC-Silicone material (the amount of time before it solidifies too much to pour into a mold) is about 40-60 minutes, the mold may optionally be placed in a vacuum chamber for 45 minutes soon after the silicone is poured to desirably remove the air bubbles as the silicone material cures.

For manufacturing a second exemplary set of fluidic actuators according to an embodiment of the invention, a ratio of TC-5005 silicone with 10 parts A, 1 Part B and 5.5 Parts C in the mixture was used. In an exemplary embodiment, the second set of fluidic actuators may desirably be used as fluidic actuators for joints with a considerably lower Young's Modulus, due to the inclusion of the softener component C. For both methods of manufacturing described above, the mold and silicone setups may be left at room temperature for about 18 hours to cure before being de-molded. In both embodiments, the cured molded silicone fluidic actuator members may desirably be cleanly and easily de-molding without any visible residue.

Bonding

In a manufacturing method according to an embodiment of the invention, the de-molded exemplary silicone fluidic actuator structures described above may then be cut and/or trimmed to a desired actuator shape, such as by using a generic paper trimmer for example, or any other suitable trimming tool or method. Next, the trimmed actuator members may be bonded to a suitable substantially inextensible structural or backbone member to enclose the actuator. An exemplary such structural or backbone member may comprise a thin polyurethane sheet, which may be selected due to its relatively high Young's Modulus and therefore inextensibility in comparison with the TC silicone molded component. A rectangular piece of the structural or backbone material may be cut out and placed on the open side of the fluidic channels in the molded silicone member, preferably with the use of a suitable bonding agent to bond the structural or backbone member to the molded silicone member.

In one embodiment, a TC silicone mixture comprising 10 to 1 A/B TC silicone is mixed and spread on the underside of the polyurethane plastic sheet before it is placed over the fluidic channel openings. In other embodiments, such as where multiple fluidic channel members may be joined together to provide a multi-directional actuator joint, the structural or backbone member may comprise any other suitable shape such as a rod, wire, column, or polyhedral prism such as may allow bonding to multiple fluidic channel members oriented in different directions, for example.

Next, in an embodiment of the inventive manufacturing method, a suitable TC silicone mixture is preferably poured over the polyurethane structural or backbone member, such that it spreads about the surface of the backbone and flows down onto the cured TC silicone fluidic channel component, to encase and enclose the backbone and fluidic channel components into a single fluidic actuator element with sealed fluidic channels. In one embodiment of the invention, the encased and enclosed actuator element is then placed into a suitable vacuum oven for about 45 minutes to degas the silicone material. Finally the structure may preferably be allowed to cure for about 18 hours before functional tests or actuation of the fluidic actuator are performed. A depiction of an exemplary etching step 301, casting step 302, demolding and bonding step 303 and sealing/enclosing step 304 for manufacturing a fluidic actuator are shown in FIG. 3, according to a method of manufacturing embodiment of the present invention. FIG. 7 also shows a set of photographs of an exemplary functional prototype fluidic actuator manufactured according to an embodiment of the invention and being actuated in use.

Experimental Setup

In one embodiment of the present invention, pneumatic pressure may be introduced into the fluidic channel structure of an exemplary fluidic actuator to actuate the actuator. To achieve this, the air-tightness of the actuator structure may desirably be verified. In one experimental embodiment, this may be done by first inserting a syringe needle onto the lateral side of the actuator structure. The actuator structure may then be immersed into a water filled beaker and the plunger of the syringe depressed to apply an internal pressure to the actuator structure. If any leak existed air bubbles may be visible and this may be used to identify defective actuator units.

In an experimental embodiment of the invention, actuator structures may be tested using a 30 mL syringe which is calibrated with respect to volume and pressure. The calibrated syringe may be mounted on a vise along with the syringe needle and actuator structure. The TC silicone microfluidic actuator may be clamped in place using a C-clamp and two 1"×3" PMMA slides. This is done to allow one of the lateral sides of the actuator to remain straight. This arrangement forms a cantilever-structure fixed at one edge. In tests completed according to an embodiment, the syringe was then gradually pressurized and the volume of the syringe and the buckling of the actuator were recorded as images using a Canon Powershot S3 IS camera. The maximum pressure applied for this phase of testing in this embodiment was about 70 kPa, however the inventive actuator may be used across other pressure ranges as desired in other embodiments. With this pressure of 70 kPa the actuator showed a deflection of 87.81 degrees from the horizontal plane. In the exemplary tests noted above, 5 cycles of pressurizing and depressurizing were performed to characterize the hysteresis response of the exemplary actuator embodiment.

A further set of experiments were performed on the above-described embodiment of a fluidic actuator, and involved force-pressure measurements obtained from the actuator during actuation. Small disc magnets of different masses were weighed using a digital balance. Using these magnets, the exemplary fluidic actuator was loaded and the functional tests were performed including 4 levels of weight, which were added to the actuator in consecutive testing steps along with associated measurement of the respective hysteresis responses. The added weight range was between 0 and 10.54 grams. For each added weight, the deflection of the free end of the actuator for the applied pressure was recorded. The experiment was cycled through 5 times and the pressure-deflection data was collected. All the recorded images were analyzed such as by using National Instruments Vision Builder software. Such analysis software allowed for the measurement of quantities such as radius of curvature and deflection of the fluidic actuator. Photos of the deflection pressure and force measurements of the fluidic actuator structure of the above-described embodiment are shown in FIGS. 4 and 5, and a graph of the Pressure vs. Deflection vs. Force for the exemplary fluidic actuator embodiment is shown in FIG. 6.

According to a further embodiment of the invention, an exemplary fluidic actuator may be driven by a fluid syringe connected in series to an analog pressure meter through a T-Joint. In an experimental test of such an actuator embodiment, the pressure was increased in steps of 0.5 to 1 psi and the actuator joint, held steady in a vice, was photographed to collect 10 to 15 data points over 4 cycles for each joint. The corresponding photographs were analyzed using image software such as National Instruments (NI) Vision Builder software. In an exemplary analysis process, each image was converted to a grayscale image, shifted into black and white with an automatically defined threshold and searched for edges which would make up the upper curve of the joint to provide for the identification of the actuator, and the measurement of its displacement. FIG. 8 shows a screenshot of this procedure, wherein green lines correspond to edge detecting vectors and red segments and curves correspond to radius, angle and curvature measurements.

Tests were first carried out on a single TC5005 AB actuator according to an embodiment of the invention. Loaded and load-less setups were tested with 4 different masses added to the end of the actuator joint. Thereafter, 4 separate TC 5005 AB actuator joints and 3 TC 5005 AB+C (including softener compound C) actuator joints according to embodiments of the invention were also tested and the results were analyzed for consistency between substantially "identical" joints and mechanical parameter differences between the two silicone actuator material types (i.e. with and without softener compound C).

Modeling of Fluidic Actuator Embodiments

Two exemplary analytical models were developed and compared to represent the static behavior of fluidic actuator embodiments according to the invention, and actuator joint systems incorporating such exemplary fluidic actuators. A Pseudo-rigid body model and an energy based model are represented and described below Pseudo-Rigid Body Model In order to model the behavior of a fluidic actuator according to an embodiment of the invention, a simplified, static model of a single channel was first created. This channel may be modeled as a flexible cantilever beam with a series of forces acting on its free end. These forces originate from internal channel pressure acting on a rigid wall ($F_{Pside}$) and a restoring force, caused by the stretching of the channel ceiling, acting on the top of the rigid section. The tip of the beam may be constrained to a near-circular, elliptical path as a result of its flexible yet relatively incompressible and inextensible nature. To simplify analysis, a pseudo-rigid-body model may be used to plot the joint's trajectory. As shown in FIG. 9, the single beam can be viewed as two rigid bars connected by a torsion spring.

In such a model embodiment, d is the joint radius and $\gamma$ is the characteristic radius of this approximated model, which is a constant that adjusts the rotational radius such that the circular path traced out by the pseudo rigid joint closely mimics the elliptical path of the flexible beam. While at low angles, both model and the exemplary actuator device would act similarly due to a relatively constant radius, higher displacements may result in a smaller bending radius in the actuator device and a constant radius in the model. In this case, $\gamma$ acts as an adjustable constant used to minimize rotational error.

Equation (1), which was obtained by interpreting the flexible, inextensible backbone material of the exemplary actuator as a joint with a torsion spring, describes the model shown in FIG. 9. Internal pressure P multiplied by wall area $A_w$ produces the pressure acting on the outside wall. Taking this wall to be static and incompressible, all the force may be assumed to be transferred to the top of the flexible beam. Multiplying this value by the adjusted beam length produces a torque which is opposed by the torsion spring ($\tau = \theta_{Inext}$), and the linear spring, which has a torque given by the sum of the last two terms in the numerator of the full equation.

$$P(\theta) = \frac{\theta K_{Inext} + \sqrt{a^2+b^2} K(\theta)_{23}((a-d) + \Box \sin(\theta))\cos(\theta) + \sqrt{a^2+b^2} K(\theta)_{23}(b + (\Box - \Box\cos(\theta)))\sin(\theta)}{\sqrt{a^2+b^2} A_w} \quad (1)$$

In equation (1), $A_w$ represents the wall area and a and h are given by $$a = d - d\gamma(1 - \cos(\theta)) \quad (2)$$

And $$b = \gamma d \sin(\theta) \quad (3)$$

The spring constants, $K(\theta)_{23}$, were calculated from the Young's Modulus of the exemplary cured TC5005 silicone material used to form a fluid channel component of an exemplary fluidic actuator embodiment. The Young's Modulus was determined through the use of a stress-strain analysis, and in particular by using an Instron Stress-Strain analysis machine. Five samples of exemplary TC5005 AB material and 5 samples of exemplary TC5005 AB+C material were tested. The results of stress-strain analysis testing of the exemplary TC5005 AB material are shown as plots in FIG. 10. Five samples of different exemplary lengths and similar thicknesses of material were tested. This resulted in stress strain curves with substantially similar slopes but dissimilar breaking points, as shown in FIG. 10. On average, the maximum Young's Modulus of each exemplary TC5005 AB sample was about 7 times higher than the maximum Modulus of the exemplary TC5005 AB+C material samples. The results of these tests are shown in Table 1 below.

TABLE 1

TC 5005 Constant Young's Modulus'

| Sample | Average Young's Modulus (Mpa) | Standard Deviation (Mpa) |
|---|---|---|
| TC 5005-AB | 0.3875 | 0.0398 |
| TC 5005-AB + C | 0.056324 | 0.016535 |

In the next step of modeling according to an embodiment of the invention, stress strain data was then used to calculate the Young's Modulus as a function of fractional extension for each exemplary material type. FIG. 11 shows the results for an exemplary TC 5005 AB sample. Stress-Strain data points are displayed in red, a polynomial fit function in blue and its derivative, the material's Young's Modulus as a function of extension, in green.

The Modulus values were then used to calculate $K(\theta)$ through a function relating joint displacement with fractional channel "ceiling" extension. The variable spring constants, obtained from the average of 5 stress-strain tests per exemplary TC5005 mixture, were then included in the above function to better reflect the non-linear properties of the exemplary Si-Rubber materials used in certain embodiments of the inventive actuator. As shown by equations (4-6), E may be given as a function of fractional extension, s, which is the relative extension of the channel ceiling. Hooke's law may then be used to calculate the linear spring constant, K, as a function of channel angle, $\theta$. Here, eqn. (5) describes the stress-strain derivative fit function plotted in FIG. 10.

$$K = \frac{A_0 E(s)}{d_0} \quad (4)$$

$$E(s) = -40818s^5 + 390610s^4 + 1391600s^3 + 2187000s^2 + 1268400s + 344030 \quad (5)$$

$$s = \frac{\sqrt{(b + (\Box - \Box\cos(\theta)))^2 + (a + \Box\sin(\theta))^2}}{d} - 1 \quad (6)$$

Similarly, the torsion string constant was empirically calculated. A 15 mm×2-12 mm×0.1 mm sheet of exemplary polyurethane backbone material was cut out and secured in a vice for testing. Masses ranging from 0.2 g to 0.8 g were hung from its tip and the resulting angle of deflection was measured. The average applied torque per unit radius of displacement was then calculated for 4 exemplary polyurethane material sheet lengths between 2 and 12 mm and an estimate for the torsion spring constant of an exemplary 0.7 mm thick sheet was extrapolated.

As equation (1) describes only a single channel, the deflection angle, $\theta$, must be adjusted to reflect the rotation of the entire joint. Assuming that all 8 fluidic channels in an exemplary embodiment of a fluidic actuator contribute equally to actuator joint deflection and that, within the fluidic channel, each half bends by the same degree, actuator joint deflection, $\Theta$, may be described as $\Theta=16\,\theta$.

The above exemplary pseudo-rigid body analytical model was compared to measured data using a constant Young's Modulus' and varying Young's Modulus values. The physical characteristics of the exemplary fluidic actuators that were modeled are listed below in Table 2. Here, the constant Young's Modulus for both exemplary silicone polymer material types tested is listed.

TABLE 2

TC 5005-AB Characteristics

| Const | Value | Unit | Description |
|---|---|---|---|
| h | 2 | mm | Channel Height |
| d | 0.35 | mm | Half Channel Width |
| La | 9 | mm | Channel Length |
| $h_2$ | 1.2 | mm | Channel Ceiling Thickness |
| $E_{AB}/E_{ABC}$ | 0.388/0.0563 | MPa | Young's Modulus |
| krot | 1.4E−06 | nm/rad | Torsional Spring Constant |

Work-Energy Model

A second exemplary analytical model was created to map actuator joint displacement using conservation of energy for an exemplary fluidic actuator joint system according to an embodiment of the invention. The second analytical model interprets the actuator joint as a black box with a fluid work input, two elastic work outputs and one load work output. In this case, Input work is calculated from the mechanical force required to displace the syringe plunger use to actuate the exemplary actuator embodiment for each pressure.

$$\int F_s \cdot dl = W_{in} \quad (7)$$

Given the plunger Area, $A_s$ and internal pressure as a function of $P_s(l)$, we have that, $$\int P_s(l) A_s \cdot dl = W_{in} \quad (8)$$

Assuming energy is conserved from the syringe to the joint, the applied work may be dissipated in three ways. First, it may be used to lift the weight of the exemplary actuator joint. By breaking the exemplary actuator mass into 8 sections, the joint may be modeled as a succession of many smaller joints, all lifting their own mass, along with those farther from the base, by an angle of $\theta/8$. Given the total number of fluidic channels, c, in an exemplary embodiment, the exemplary actuator mass m and gravity, g, we have that, $$W_{lift} = \frac{m}{8} g \sin\left(\frac{\theta}{8}\right) \sum_{i=1}^{c-1} i \quad (9)$$

Second, energy will be expended bending the inextensible material in the exemplary fluidic actuator. By modeling the exemplary actuator as 16 joints with torsion spring constants $k_{tor}$, the work required to displace the full actuator by an angle of $\theta$ would be, $$W_{tor} = 8 k_{tor} \left(\frac{\theta}{16}\right)^2 \quad (10)$$

Finally, energy may be dissipated resisting the expansion of the exemplary TC5005 AB polymer material. In the previous simplification, each channel was impeded by two springs acting against its deformation. This model treats the upper third of the embedding material as a single, elastic slab. Energy required for the bending of the joint is then calculated using the Euler-Bernoulli Beam equations:

$$W_{curv} = \frac{EI}{2} \int_0^L \left(\frac{d^2 y}{dx^2}\right)^2 dx \quad (11)$$

Here, the second derivative of y displacement with respect to x is an estimation of curvature. Integrating its square over the length of the exemplary actuator joint and multiplying by its Inertia, 1, and Young's Modulus, E, gives the required strain energy needed to achieve the bending described. A sinusoidal function was used to describe the position of the exemplary actuator as a function of displacement angle. Its amplitude and period were chosen to increase and decrease respectively as a function of angular displacement.

$$y = -A(\theta)\cos(B(\theta)x) + A(\theta) \quad (12)$$

With the two restrictions restriction:

$$\tan(\theta) = \frac{-A(\theta)\cos(B(\theta)d) + A(\theta)}{d} \quad (13)$$

which stipulates that A and B remain functions of the angular displacement of the tip of the actuator and, $$\cos\left(\frac{\pi}{4}\right) = \cos(B(\theta)d\cos(\theta)) \quad (14)$$

which restricts the extend of the cosine function being considered, the final displacement is given by:

$$y = -\frac{d\tan(\theta)}{\left(1 - \cos\left(\frac{\pi}{4d\cos(\theta)}\right)\right)} \cos\left(\frac{\pi}{4d\cos(\theta)} x\right) + \frac{d\tan(\theta)}{\left(1 - \cos\left(\frac{\pi}{4d\cos(\theta)}\right)\right)} \quad (15)$$

A plot of y(x) for varying theta can be found in the appendix. The resulting integral, from equation (11) is given by:

$$\int_0^L \left(\frac{d^2 y}{dx^2}\right)^2 dx = \quad (16)$$

$$\left. \frac{\pi^3 \tan^2(\theta)\left(\frac{1}{2}\cos\left(\frac{\pi x}{4d\cos(\theta)}\right)\sin\left(\frac{\pi x}{4d\cos(\theta)}\right) + \frac{\pi x}{8d\cos(\theta)}\right)}{64 d\cos^3(\theta)\left(1 - \cos\left(\frac{\pi x}{4d\cos(\theta)}\right)\right)^2} \right|_0^L$$

Combining the work done raising the joint, bending the exemplary TC 5005 material of the actuator base and twisting the substantially inextensible exemplary backbone member, a function of work given angular displacement was created. This was set to be equivalent to the work required to displace the syringe and apply internal pressure to the actuator joint. A fit function was created which correlated applied pressure and syringe displacement. It was found through repeated measurements of plunger distance and measured pressure. This was used to describe the average required syringe displacement, L, as a function of work done on the exemplary actuator, $$L = \sqrt{\frac{2}{A_s 4 * 10^6}(W_{lift} + W_{curve} + W_{tor})} \quad (17)$$

where $A_s$ is the syringe pump area. Including equations (12, 13, 14) and making use of relation (17), a function describing angular displacement given input pressure may be described:

$$P = L(4*10^6) = \sqrt{\frac{2}{A_s 4 * 10^6}(W_{lift} + W_{curve} + W_{tor})} \quad (18)$$

Modeling Test Results

Initial testing was performed to compare the three exemplary fluidic channel designs shown in FIG. 2 in actuators according to embodiments of the invention, which revealed substantially similar performance of the three exemplary fluidic channel designs when implemented in corresponding exemplary fluidic actuator embodiments. As such, analytical models with identical fluidic channel dimensions yet different exemplary fluidic channel topologies were used interchangeably during further tests of actuator embodiments. An exemplary actuator using TC5005 AB material was tested with loads ranging from 0-40 grams. Masses were attached at 12 mm from the exemplary actuator joint base and allowed to swing freely during actuation. Pressure was applied very slowly in order to simulate a quasi-static behavior; the actuator joint was allowed to completely settle such that the static response of the device could be obtained. Two actuation cycles were carried out in series for each test.

Such testing revealed a substantially consistent shift in range of motion with the addition of each new mass. As well, the flattened exponential curve was substantially maintained despite loading variances in the observed tests. As the test load mass increased, angular displacement appeared to be more consistent. At 0 mN added force, the average standard deviation of angular displacement was 1.83 Degrees. By comparison, loads of 44.1, 103.8, 200.7 and 285 mN showed 1.59, 0.63, 0.385, and 0.517 degrees of average standard deviation. This trend may be a result of hysteresis affects at high angles of displacement. The average force per unit pressure for the exemplary tested actuator device, found using data points at 0 degrees actuation for each load, was calculated to be 4.8 E-06 N/Pa. This is slightly larger than the value of 2.5 E-06 N/Pa obtained for another exemplary flexible fluidic actuator embodiment of substantially comparable size discussed in [7]. A plot of actuator rotation of an exemplary TC5005 AB actuator versus applied pressure with varying maximum torques according to an embodiment of the invention is shown in FIG. 12.

The plot in FIG. 13 shows the results of the comparison of exemplary TC5005 AB and TC5005 AB+C material actuator embodiments, tested at 0 g load, according to one embodiment. As predicted by the static model, a much lower Young's modulus in the actuator embodiments incorporating the exemplary TC5005 AB+C material has resulted in greater actuation for a lower pressure in those exemplary actuator embodiments. While the exemplary TC5005 AB+C material sample appears to respond to a much lower pressure, it shows considerably more hysteresis in its motion. The average standard deviation of deflection over a range of 20 kPa is 3.94 degrees. This inconsistency may have come about as a result of the overexpansion of the fluidic channel ceiling, that is the thin layer of exemplary polymer material enclosing each fluidic channel opposite the substantially inextensible backbone material. It was observed that during depressurization that individual fluidic channels that had initially bulged would begin contracting at a lower pressure than had been required for expansion. Such behavior suggests that the internal pressure of the exemplary actuator may be different than that of the syringe. This could potentially be attributed to a temporary blockage of the fluid delivery channel.

In FIG. 14 initial predicted results from the constant Young's Modulus, pseudo-rigid body model are plotted, in blue, with measured data according to one embodiment. In this first approximation, the Young's Modulus used is set to 0.388 MPa.

The analytical model used in the above-detailed experimental embodiment, described by equations (1-6), makes a number of key assumptions. First, that volume change in the exemplary actuator is negligible in comparison to that in the syringe. Second, that the fluidic channel walls are entirely incompressible. Third, that all exemplary fluidic channels contribute equally to actuation. And finally, it assumes that the fluidic channel ceiling can be modeled as a single spring, strung between a movable object and a static point. These last two simplifications restrict individual fluidic channels to identical paths of motion and topologies. This was not what was observed in the exemplary testing, however, as each exemplary fluidic channel was displaced by a slightly different amount and not every fluidic channel ceiling expanded to the same degree. The non-constant Young's Modulus, pseudo-rigid body model reflects this by including a constant which corresponds to the number of "active" actuating channels in the exemplary fluidic actuator joint. Results of application of the second pseudo-rigid-body model according to an embodiment are shown below. Apart from the addition of a scaling constant, equation (1) is adjusted with the inclusion of a non-constant Young's Modulus, as described by equations (4) to (6).

With all 8 exemplary fluidic channels acting as the model suggests, the predicted displacement error increase by about 5 degrees per 10 kPa. Assuming only 4 exemplary fluidic channels are contributing to the full displacement of the exemplary fluidic actuator, the model accurately predicts actuator joint position up to 60 kPa. At this point, the Young's Modulus of the softer polymer material increases until the channel ceiling "spring" is predicted to have a greater restraining effect on fluidic channel expansion than measured. As an accurate Poisson's ratio for the exemplary polymer material was not obtained, the shrinking of the fluidic channel ceiling cross-sectional area was not included in the model. It is likely that altering the physical model to properly reflect the shrinking fluidic channel ceiling may net a sufficiently decreasing linear spring constant K to rectify the predicted motion error above 60 kPa.

In comparison, when the same model (with the corresponding non-constant Young's Modulus') is used to describe the motion of the exemplary actuator embodiments using TC5005AB+C material samples, both a fully active exemplary actuator and a half active exemplary actuator provide more accurate description of angular displacement. This is primarily due to the large displacement variance for each measurement.

The results from the work energy model discussed above are illustrated in FIGS. 15-17. Data points from the tests of embodiments using exemplary TC 5005 AB materials were compared with a model developed using the Young's Modulus of the same material type. It is clear that the model overestimates the pressure and work required for actuation past 15 degrees. This may be because it offers an over simplified version of the exemplary actuator base, one which does not include the affect of the fluidic channel divots on energy loss to elastic bending. It could however be used for small pressures and angles. In summary, according to the above-described experimental embodiments, while the pseudo-rigid-body model appears to be more accurate, it requires a more explicit description of the interior of the exemplary actuator embodiment being modelled. By comparison, interior fluidic channel shape and size need not be defined for application of the work-energy model to an exemplary fluidic actuator embodiment according to an embodiment of the invention.

Microscale Fluidic Actuator Embodiments

According to a further embodiment of the present invention, exemplary fluidic actuator devices may be manufactured in micro-scale by using micro electromechanical systems (MEMS) technology to create micro fluidic actuators, which may be used in particular applications requiring very small actuators. In one such embodiment, a mold for the fluidic channels of such micro-actuators may be created by using a photoresist process, such as the SU-8 negative photoresist process, to create the micro fluidic channel mold. Using the SU-8 process, a thin film of SU-8 material of desired thickness may be deposited such as by spinning and/or spreading of the SU-8 material, following which a photoresist mask with a desired fluidic channel pattern or configuration (such as the exemplary fluidic channel patterns shown in FIG. 2, for example) may be overlaid on the SU-8 material to allow the controlled exposure of the SU-8 material by a suitable light source, such as a UV light source. Following exposure, a developer (such as PM acetate) may be used to dissolve unexposed or unpolymerized SU-8 material, to leave a micro fluidic channel mold. The micro mold may then be used to mold an extensible polymer material such as silicone, as described above in other embodiments, to form a micro fluidic actuator. Using such methods, an exemplary micro-fluidic actuator with fluidic channel mold widths as narrow as 100 nm may be produced.

Further Actuator Designs

According to a further embodiment of the present invention, fluidic actuators may be provided which incorporate one or more substantially planar fluidic channel configurations such as planar channel configurations 1801 and 1802 illustrated in FIG. 18, which provide for the flow of an actuating fluid within the actuator to expand the polymer body of the actuator and cause the desired actuator movement. In one such embodiment 1801, as shown in FIG. 18, the fluidic channels of an exemplary actuator may be arranged as a series of substantially parallel channels extending widthwise across a portion of the actuator body, where adjacent channels are fluidly connected by staggered arcs at the ends of the channels. In another embodiment 1802, as shown in FIG. 18, the parallel channels may be connected by a central lengthwise channel or "divot". The use of a central lengthwise channel extending along a portion of the actuator body length may provide for reduced asymmetric bending of the exemplary fluidic actuator upon actuation.

In yet a further embodiment of the invention, substantially planar fluidic actuator designs having variable perpendicular fluidic channel density may be provided. As shown in FIG. 19, fluidic actuators 1901 and 1902 with varying density of perpendicular or widthwise fluidic channels may be designed. FIG. 19 shows an exemplary actuator design 1901 with a relatively high density of individually narrow perpendicular fluidic channels. Exemplary actuator design 1902 of FIG. 19 shows an actuator with relatively lower density of individually wider perpendicular fluidic channels, and exemplary actuator design 1903 comprises varying perpendicular fluidic channel width along the length of the actuator. Such variations in perpendicular channel width and density may be used to vary the maximum force and final bending shape of the actuator in use. Similarly, changing the width and density of perpendicular fluidic channels may also allow the bending shape of an exemplary fluidic actuator to be tailored to specific applications and/or to alter the maximum torque distribution along the length of the actuator.

In another embodiment of the present invention, fluidic actuators with varying central fluidic channel positions may be provided, such as the exemplary actuators 2001 and 2002 illustrated in FIG. 20. As shown in the exemplary actuator 2001 illustrated in FIG. 20, a central connecting fluidic channel which connects adjacent perpendicular channels may be progressively shifted laterally across the actuator as you move along the length of the actuator body, such as to provide varying degrees of x-y or rotational movement within the plane of the actuator upon actuation, in addition to the expected z-directional bending of the actuator upon actuation. Also, as shown in the exemplary actuator 2002 in FIG. 20, multiple separate connecting fluidic channels may be provided, such as a right and left central channel, to connect the perpendicular fluidic channels on each side of an exemplary actuator. This allows for the individual pressurization of either the right or left array of fluidic channels during actuation, to control selective bending in the x-y plane of the actuator, as well as motion in the z-direction perpendicular to the plane of the actuator.

In yet another embodiment of the present invention, fluidic actuators with angled or substantially non-perpendicular fluidic channels may be provided, such as the exemplary actuators 2101 and 2102 shown in FIG. 21. As shown in actuator design 2101, a central connecting channel may be used to connect multiple substantially parallel fluidic channels angled across the actuator, or alternatively, as shown in actuator 2102, a connecting channel may be oriented along an edge of the actuator to connect multiple substantially parallel fluidic channels angled across the actuator. Such use of angled fluidic channels may provide for bending of the actuator about two axes in a swooping "J" motion upon actuation, for example. Adjustment of the location and spacing of a connecting fluidic channel may also be used to alter the bending shape of the actuator.

Fluidic Actuators with Multi-Planar Actuation

Multi-planar fluidic actuators capable of providing independently controllable actuation in two different planes of motion are also provided according to an embodiment of the present invention. In each of the multi-planar fluidic actuators illustrated in FIGS. 22-25, a single exemplary flow channel arrangement or pattern is shown (multiple substantially parallel perpendicular channels connected by a central connecting channel), however each of the multi-planar fluidic actuators described below may incorporate any suitable fluidic channel pattern, such as those described above, for example. In FIGS. 22-25, substantially inextensible backbone component members of the illustrated fluidic actuators are shown in red. Also, in FIGS. 22-25, any fluidic channels which are shown as being open to clearly visualize the illustrated actuator designs in the Figures are sealed in the actual fluidic actuators according to embodiments of the invention by means of a molded polymer or sheet of similar flexible or extensible material so as to provide a sealed and operable actuator structure.

FIG. 22 illustrates a multi-planar actuator 2201 according to an embodiment of the invention, that provides for separately controllable bending over two degrees of freedom (DOF) or in two planes. As shown in FIG. 22, two single plane actuator units may be stacked or otherwise suitably attached in perpendicular arrangement relative to each other to form the multi-planar fluidic actuator, so that actuation of each of the actuator units independently allows for independently controllable actuator motion in two planes or directions. In the multi-planar actuator embodiment 2201 shown in FIG. 22, the visible fluidic channels would each be sealed by an inextensible yet flexible backbone member, such as an exemplary polyurethane sheet member as described above, for example.

FIG. 23 illustrates three further multi-planar fluidic actuators 2301, 2302 and 2303, according to embodiments of the invention, that provide for independently controllable actuation over two degrees of freedom (DOF). FIG. 23 shows an exemplary multi-planar actuator 2301 having two individual actuator units attached substantially perpendicularly to each other along a common side where a substantially inextensible backbone member, such as an exemplary polyurethane sheet, is attached along the interior surfaces of the actuator units to seal the fluidic channels. FIG. 23 also shows a similar multi-planar actuator embodiment 2302 except that the inextensible backbone member of actuator 2302 is provided as a cord, rod, column, wire, or similar linear strip of substantially inextensible but flexible material that is oriented along the spine of the joined actuator units, and acts as a substantially inextensible backbone for both independent actuator units. FIG. 23 also shows a further multi-planar actuator embodiment 2303 similar to actuator 2302, however in actuator 2303, the actuator units are provided in a substantially triangular rather than rectangular form, and are connected in a substantially perpendicular arrangement along a common edge.

FIG. 24 illustrates front and rear views of a further multi-planar fluidic actuator 2401 according to an embodiment of the invention that provides for independently controllable actuation over at least two degrees of freedom (DOF). The multi-planar actuator 2401 shown in the views of FIG. 24 comprises a substantially semi-cylindrical actuator with a substantially inextensible but flexible backbone member running down the center of the cylindrical cross-section. As shown in FIG. 24, the semi-cylindrical actuator 2401 comprises two, perpendicularly oriented actuator units with separate fluidic channels extending in substantially perpendicular directions and a single substantially inextensible backbone cord, column, rod or wire member, which provides for independent actuation in two planes. In another related embodiment, attaching two such semi-cylindrical actuators back to back to would result in a substantially cylindrical four-input actuator point which, while having a potentially slightly impeded range, would allow greater control of position through the variation of actuation pressure in four separate actuator channel arrays.

Similarly, multi-actuator joints comprising three or another suitable number of fluidic channel members attached around a common elongated (such as a rod, wire, column, or cord) substantially inextensible central backbone element so as to provide for independently controllable actuation of each fluidic channel of the actuator joint to provide independently controllable actuation movement of the actuator joint in multiple directions, dimensions, or over multiple degrees of freedom. In one such embodiment, more than one fluidic channel may also be simultaneously actuated in order to actuate movement of the actuator joint in an average or common direction, depending on the orientation of the fluidic channel members around the backbone member. In one application of such an actuator according to an embodiment of the invention, an actuator joint substantially similar to actuator 2401 may be used to provide independently controllable multidimensional actuation control of a catheter, laparoscope or other flexible tool, such as for guiding such a tool remotely during use, for example.

FIG. 25 illustrates three further multi-planar fluidic actuators 2501, 2502, and 2503, according to embodiments of the invention, that provide for independently controllable actuation over at least two DOF, or in at least two different directions. In some embodiments, multi-planar actuators may comprise larger numbers of independent actuator arrays centered around one or more substantially inextensible cord, column, rod or wire backbone members, for example. Specific embodiments may implement 3, 4, 5, 6, 7, 8, 9, 10, or 12 individually controllable fluid channel members or actuator arrays, for example. In a further embodiment, one or more such fluid channel members or actuator elements may be collectively controlled in groups, such as paired opposing elements, so as to provide for greater force or simplified control of multidirectional or multi-DOF control of actuator joint movement.

FIG. 25 illustrates an exemplary embodiment of a multi-planar actuator 2501 comprising two substantially trapezoidal actuator units attached in a substantially semi-dodecahedral prismatic orientation, with a single central substantially inextensible backbone member. Accordingly, the direction of deflection of the actuator may be controlled by which of the actuator arrays are pressurized during actuation.

FIG. 25 further illustrates an exemplary embodiment of a multi-planar actuator 2502 comprising three substantially planar actuator units attached in a triangular prism, with three individual central substantially inextensible fibers or backbone members, each one substantially perpendicularly oriented with respect to the three directions of actuation motion of the three actuator units. This orientation may desirably provide additional precision in the control of movement of the multi-planar actuator joint, for example.

FIG. 25 also illustrates an exemplary embodiment of a multi-planar actuator 2503 comprising four tapered individual actuator units arranged in a substantially tetrahedral arrangement, with a single central substantially inextensible backbone cord or wire. Such a design may desirably allow for 2 DOF bending of the multi-planar actuator with low resistance, as may be controlled by tandem actuation/contraction of opposing actuator units, for example.

Fluids and Materials

In embodiments of the present invention, such as those described in detail above, a number of types of fluids may be used to pressurize fluidic actuators according to the invention. In one embodiment, air may be used as a pressurization fluid, which has the advantage of being readily available, harmless if released and non-viscous, but may be disadvantaged by its relatively high compressibility. While the compressibility of air as a fluid may not affect the performance of an exemplary actuator device, it may require a somewhat more complex control system to account for the non-linear pressure-volume relationship for the compression of air.

In another embodiment, other less compressible fluids may be employed as a pressurization fluid. In a particular embodiment, unfiltered or de-ionized water may be used as a pressurization fluid. Although water may be viscous on the micro-scale, larger, millimeter and above sized actuator embodiments may not be expected to suffer from the effects of the viscosity of water. In an embodiment directed towards biomedical applications, saline solution or a similar bio-compatible liquid could be used as a pressurization fluid. In yet a further embodiment, other compressible fluids may also be used.

In another embodiment of the present invention, variable viscosity fluids may be implemented as pressurization fluids, in order to adjust the rigidity of the fluidic actuators. In one exemplary embodiment, magnetorheological fluids may be used, such fluids comprising microspheres of magnetic material, which, in the absence of a magnetic field, flow with the viscosity of the fluid in which they are suspended (which may typically be an oil). However, once a magnetic field is applied, the microspheres coalesce about the areas of highest magnetic field intensity. Depending on the magnetic field, the resulting increase in fluid viscosity of the magnetorheological fluid can be great enough to cause the fluid to solidify. An illustration of the effect of a magnetic filed on an exemplary magnetorheological fluid is shown in FIG. 26. Such a magnetorheological effect may be exploited according to an embodiment of the invention to apply further support to a static fluidic actuator joint once it has been actuated to a bent configuration, for example.

In a further similar embodiment, an electrorheological fluid for which the fluid viscosity may be affected by an electric field, may also be used as a pressurization fluid in a fluidic actuator. In yet a further embodiment, superparamagnetic fluids (or ferrofluids) may be used to actuate a fluidic actuator device in the presence of a magnetic field. Ferrofluids comprise nano-spheres of ferromagnetic material suspended in a solution. Unlike magnetorheological fluids, ferrofluids do not suffer a change in viscosity under the influence of a magnetic field, rather, they will flow to take a form closely related to the field shape. Therefore, by injecting an exemplary fluidic actuator with a ferrofluid and concentrating the applied electric field at the end of the actuator joint, the internal pressure in the actuator and thus, applied force exerted by the actuator can be adjusted by increasing or decreasing the electric field intensity.

In yet a further embodiment of the present invention, magnetohydrodynamic fluids may be used as a pressurization fluid in an exemplary fluidic actuator, to create an actuator which may be activated and controlled without mechanical intervention. Injecting an exemplary actuator device with electrically conducting fluids may allow the application of pressure via two highly charged parallel plates at the actuator joint base. This may provide for replacing the requirement for a micropump or mechanically operated syringe in order to actuate the fluidic actuator. Furthermore, in another embodiment, smaller charged plates may also be embedded along the length of the substantially inextensible backbone of the actuator device such that actuation pressures may be independently adjusted at each fluidic channel by controlling the applied electrical current at each location.

In another related embodiment, actuation pressure may be applied to the fluidic channels of an exemplary fluidic actuator using the liquid-gas phase change properties of a suitable pressurization fluid to increase the volume and decrease the viscosity of a pressurization fluid in the actuator in response to an increase in temperature. In particular, low temperature refrigerants such as alcohol, acetone, or commercially used refrigerant liquids may be used. In such an embodiment, a temperature change in the actuator may be achieved by providing a heating device in the fluid channel of the actuator, such as a high resistance conductive fiber or filament in the fluid channel, to which an electrical current may be applied to heat the pressurization fluid. In a similar further embodiment, a solid-liquid phase change of suitable materials may be used to provide a pressure change inside the actuator—such as by using paraffin wax or a similar material which may be melted by an increase in temperature within the actuator fluid channel, for example.

In one embodiment of the present invention, various materials may be used to provide the substantially inextensible yet flexible backbone component of exemplary actuators such as those described above. In some embodiments, cellulose acetate, polyethylene, polyurethane, or other similar light plastics may be advantageously used, such as in particular for millimeter scale actuator joints, for example. In other embodiments, fabrics, such as substantially inextensible synthetic textiles may be used. In a further embodiment, piezoelectric material sheets and/or fibers may be used as a backbone material, and may also advantageously provide angular displacement sensing properties, such as by using resistive sensors to detect the angular displacement of an exemplary actuator device. In alternative embodiments, optical fibers, plexi-glass, polytetrafluoroethylene (or PTFE) or metallic strip materials (such as but not limited to aluminum, titanium, zinc, magnesium, gold, copper and/or alloys thereof for example), or shape memory alloy (SMA) materials may also be used as backbone materials.

The above description of exemplary embodiments of the present invention, including what is described in the Abstract, is not intended to be exhaustive or to limit the embodiments of the invention to the precise forms disclosed above. Although specific embodiments and examples are described herein for illustrative purposes and to allow others skilled in the art to comprehend their teachings, various equivalent modifications may be made without departing from the spirit and scope of the disclosure, as will be recognized by those skilled in the relevant art.

What is claimed is:

1. A multi-directional fluidic actuator comprising:
    a first actuator member extending along a first longitudinal axis of the actuator to provide actuation in a first plane, and a second actuator member extending along a second longitudinal axis of the actuator to provide actuation in a second plane;
    said first actuator member comprising a first fluid channel embedded in a first elastically extensible material which comprises a plurality of fluidly connected channels extending substantially perpendicular to said first longitudinal axis of said actuator; a first substantially inextensible and flexible backbone member attached to said first elastically extensible material adjacent to the first fluid channel; wherein said first backbone member extends substantially parallel to said first longitudinal axis of said actuator to provide actuation in said first plane by elongation of said first elastically extensible material under pressurization of said first fluid channel; and
    said second actuator member comprising: a second fluid channel embedded in a second elastically extensible material which comprises a plurality of fluidly connected channels extending substantially perpendicular to said second longitudinal axis of said actuator; a second substantially inextensible and flexible backbone member attached to said second elastically extensible material adjacent to the second fluid channel; wherein said second backbone member extends substantially parallel to said second longitudinal axis of the actuator to provide actuation in said second plane by elongation of said second elastically extensible material under pressurization of said second fluid channel.

2. The multi-directional fluidic actuator according to claim 1, wherein said first and second actuator members are independently controllable by independently controllable pressurization of at least one fluid contained within said first and second fluid channels.

3. The multi-directional fluidic actuator according to claim 1, wherein said first and second longitudinal axes are substantially co-parallel, and wherein said first and second backbone members are joined along at least one line substantially parallel to said first and second axes.

4. The multi-directional fluidic actuator according to claim 1, wherein said first and second fluid channels comprise at least one tortuous or meandering fluid passage.

5. The multi-directional fluidic actuator according to claim 1, wherein said first and second elastically extensible materials comprise at least one of silicone and elastomeric materials.

6. The multi-directional fluidic actuator according to claim 1, wherein said first and second substantially inextensible and flexible backbone members comprise at least one material selected from the list comprising: cellulose acetate, polyethylene, polyurethane, plastics, synthetic fabric, piezoelectric, optical fiber, plexi-glass, polytetrafluoroethylene, shape memory alloy and metallic materials.

7. The multi-directional fluidic actuator according to claim 1, further comprising a third actuator member comprising: a third fluid channel embedded in a third elastically extensible material; a third substantially inextensible and flexible backbone member attached to the third elastically extensible material adjacent to the third fluid channel; wherein said third backbone member extends substantially parallel to a third longitudinal axis of the actuator to provide actuation in a third plane by elongation of said third elastically extensible material under pressurization of said third fluid channel.

8. A multi-directional fluidic actuator comprising:
    a first actuator member comprising a first fluid channel embedded in a first elastically extensible material;
    a second actuator member comprising a second fluid channel embedded in a second elastically extensible material; and
    said multi-directional fluidic actuator further comprises a substantially inextensible and flexible backbone member extending along a longitudinal axis of said fluidic actuator and attached to said first and second elastically extensible material adjacent to said first and second fluid channels of said first and second actuator members, wherein said first and second fluid channels each comprise a plurality of fluidly connected channels extending substantially perpendicular to said longitudinal axis of said actuator, to provide actuation in a first plane by elongation of said first elastically extensible material under pressurization of said first fluid channel, and to provide actuation in a second plane by elongation of said second elastically extensible material under pressurization of said second fluid channel.

9. The multi-directional fluidic actuator according to claim 8, wherein said first and second actuator members are independently controllable by independently controllable pressurization of at least one fluid contained within said first and second fluid channels.

10. The multi-directional fluidic actuator according to claim 8, wherein said first and second fluid channels comprise at least one tortuous or meandering fluid passage.

11. The multi-directional fluidic actuator according to claim 8, wherein said first and second elastically extensible materials comprise at least one of silicone and elastomeric materials.

12. The multi-directional fluidic actuator according to claim 8, wherein said substantially inextensible and flexible backbone member comprises at least one material selected from the list comprising: cellulose acetate, polyethylene, polyurethane, plastics, synthetic fabric, piezoelectric, optical fiber, plexi-glass, polytetrafluoroethylene, shape memory alloy and metallic materials.

13. A method of manufacturing a fluidic actuator comprising:
    producing a lithographic mold of at least one fluidic actuator member comprising at least one fluidic channel;
    casting at least one elastically extensible material into said lithographic mold to form at least one elastically extensible fluidic channel;
    demolding said elastically extensible material from said mold;
    attaching at least one substantially inextensible backbone member to at least one surface of said elastically extensible material; and
    enclosing said elastically extensible material and said backbone member to seal said at least one fluidic channel and enclose said fluidic actuator member.

14. The method of manufacturing a fluidic actuator according to claim 13, wherein said at least one elastically deformable material comprises at least one of a silicone and elastomeric material.

15. The method of manufacturing a fluidic actuator according to claim 13, wherein said lithographic mold comprises a poly methyl methacrylate template and said producing comprises etching said template by laser ablation.

* * * * *